This invention relates generally to the incorporation of an electrochemically active cadmium compound into a nickel plaque, and is particularly concerned with the preparation of negative plates suitable for use in nickel-cadmium storage batteries.

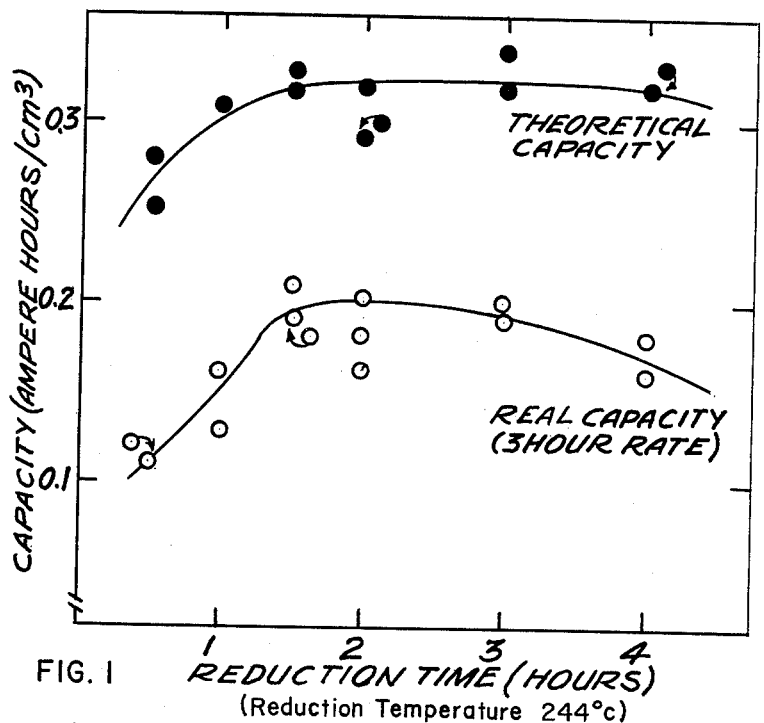
FIG. 1 (Reduction Temperature 244°c)
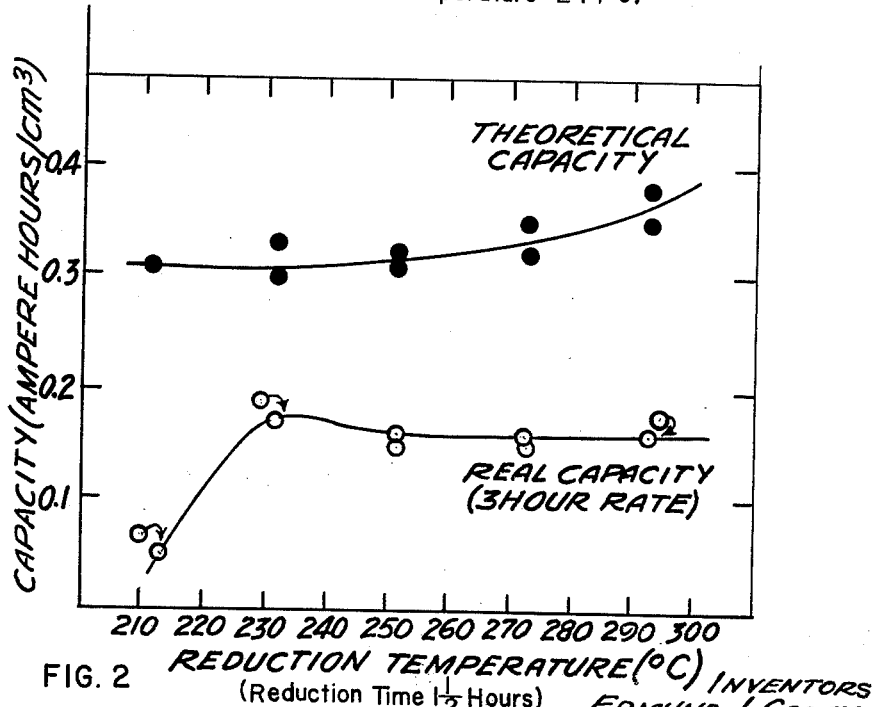
FIG. 2 (Reduction Time 1½ Hours)
INVENTORS
EDMUND J. CASEY,
PHYLLIS E. LAKE & GEORGE D. NAGY
By Smart+Biggar
ATTORNEYS 3,068,310
METHOD OF INCORPORATING AN ELECTRO-
CHEMICALLY ACTIVE CADMIUM COM-
POUND INTO A POROUS NICKEL PLAQUE
Edmund J. Casey, Almonte, Ontario, Phyllis E. Lake, Ottawa, Ontario, and Gerard D. Nagy, Cooksville, Ontario, Canada, assignors to Her Majesty the Queen in right of Canada as represented by the Minister of National Defence
Filed Dec. 7, 1959, Ser. No. 857,790
Claims priority, application Canada Aug. 10, 1959
4 Claims. (Cl. 136—24)

The presently available commercial techniques for preparing negative plates for nickel-cadmium storage batteries are expensive and time-consuming. The commercial impregnation normally proceeds as follows. Sintered nickel plaques are dipped in aqueous cadmium nitrate, transferred to a bath of warm NaOH, and made the negative plate of an electrolytic cell for about 20 minutes. During the electrolysis cadmium nitrate is converted into insoluble cadmium hydroxide in the pores of the plaque.

Because only about 25% of the required cadmium is impregnated into the pores during such an operation, the operation (or cycle) must be repeated at least four times, with a complete washing and drying between cycles.

This prior procedure has the drawbacks that it (a) is time-consuming; (b) takes at least 4 cycles of 4 steps each; and (c) is not adaptable to continuous processing methods.

We have found that the electrolytic step can be replaced by a step which involves heating the plate, after immersion in the cadmium nitrate, in a hydrogen atmosphere; and our process is of considerable commercial interest since, by adopting it, one can in two impregnation cycles produce negative plates having capacities which compare favourably with those previously commercially produced by electrolytic procedures involving four impregnation cycles. The method of the invention lends itself to continuous processing, and the physical strength of the finished plates is satisfactory.

Our present contribution to the art thus complements the contribution of P. L. Bourgault, E. J. Casey and P. E. Lake disclosed in U.S. Patent No. 2,831,044 of April 15, 1958, which disclosed a process for impregnating nickel plaques with nickel hydroxide to form the positive plates of Ni-Cd batteries which, in a single impregnation cycle, gave results comparable with those obtained in prior commercial practice with four impregnation cycles.

The present invention may be generally defined as a method of incorporating an electrochemically active cadmium compound into a porous sintered nickel plaque which comprises soaking the plaque in a bath of $Cd(NO_3)_2.4H_2O$ which has been heated to boiling at a sub-atmospheric pressure, removing the plaque and reducing the cadmium nitrate contained therein by heating the plate in a hydrogen filled container for at least about ½ hour at a temperature of from about 200° C. to about 300° C. and allowing the plaque to cool in a hydrogen atmosphere.

We have found that negative plaques treated as above, except for the presence of a hydrogen atmosphere during the heating step, disintegrated badly, especially during subsequent electrical cycling; but that good mechanical strength could be realized in the finished plate if the thermal decomposition was carried out in such a reducing atmosphere.

In the attached drawings illustrating results obtained using the method of the invention;

FIGURE 1 is a graph showing the relationship between capacity and reduction time in a case where the reduction temperature is held constant, and FIGURE 2 is a graph showing the relationship between capacity and reduction temperature, in cases where the reduction time is a constant.

The porous sintered nickel plaques which we employ do not differ from those previously commercially employed as the starting material in the preparation of negative plates although it is not believed that the porous nickel plaques are the only usable supporting matrix for the active material. The plaques are washed in acetone, and dried, prior to use. The washed and dried plaques are then immersed in cadmium nitrate [$Cd(NO_3)_2.4H_2O$] dissolved in its own water of crystallization. This immersion step is preferably carried out at a sub-atmospheric pressure and the cadmium nitrate should first be heated until it boils at the pressure employed, e.g. about 62.5° C. if the pressure is 15–18 mm. of Hg. After soaking for about 10 minutes in the cadmium nitrate, the plaques are removed and transferred to a closed system in which they are heated in a reducing atmosphere. We presently prefer to use an electrically heated furnace disposed within an enclosed space which can be flushed out with hydrogen and a hydrogen atmosphere then maintained therewithin.

With such an apparatus the plaques are heated in a hydrogen atmosphere for from about ½ hour to 2 hours or more at a temperature ranging from about 200° C. to about 300° C.; and preferably for about 1½ hours at a temperature of about 230° C. The plaques are then allowed to cool in the hydrogen atmosphere.

An example of a process according to the invention will now be described. Sintered carbonyl nickel plaques having the dimensions 1" x 0.75" x 0.025" were washed in acetone, air-dried, weighed, and then immersed in a reagent grade of cadmium nitrate which had been dissolved in its own water of crystallization and then brought to boiling by heating to about 62.5° C. while the bath was held within a container which had been evacuated to a pressure of about 15–18 mm. of Hg. The immersion occurred as soon as possible after boiling of the $Cd(NO_3)_2.4H_2O$ started, and the plaques were allowed to soak for 10 minutes while the pressure in the container was maintained at the reduced pressure just specified. The container was then opened to the atmosphere, and the plaques were transferred to an electric furnace disposed within a closed container provided with means for passing a stream of hydrogen therethrough. This container was then flushed out with hydrogen. As soon as this was achieved, which took about two minutes from the time of removing the plaques from the cadmium nitrate bath, the heat was turned on and the furnace brought up to a temperature of about 230° C. It was maintained at this temperature in the hydrogen atmosphere for 1½ hours, whereupon the heat was turned off and the plaques allowed to cool in the furnace under hydrogen. On removal from the furnace the plaques were dark red-brown in colour and had some loosely adhering material on their surfaces. They were washed in distilled water, dried, and weighed.

After measuring the increase in weight of each plaque, the theoretical capacities were calculated on the assumption that the gain in weight was all attributable to impregnation of the sintered plaques with CdO. (Although the active material in the plaques was almost certainly cadmium metal at the end of the reduction, this metal would, it is thought, be converted to its oxide form upon exposure to air after cooling.) The average theoretical capacity of the plaque was found to be approximately 0.3 ampere hour per cubic centimeter. The real capacity was then measured by cycling the treated plaques in test cells of appropriate size, using the cell design described in an article by E. J. Casey et al. entitled "Nickel-Cadmium Batteries" which appeared in volume 34, Canadian Journal of Technology (1956), at pages 95–103. The cycling program consisted of 3 forming cycles of the type suggested by A. Fleischer in volume 98, Journal of the Electrochemical Society (1948), page 289, followed by 5 cycles as follows:

| Charge | Discharge |
| --- | --- |
| 2 hrs. at 1 hr. rate. | 20 hr. rate. |
| 2 hrs. at 1 hr. rate. | 3 hr. rate. |
| 2 hrs. at 1 hr. rate. | 1 hr. rate. |
| 2 hrs. at 1 hr. rate. | 1 amp. |
| 2 hrs. at 1 hr. rate. | 3 hr. rate. |

The average real capacity of the experimental plaques made according to the specific example described above was found to be approximately 0.18 ampere hour per cubic centimeter (3 hour rate).

Using the same general plaque impregnating and testing procedures as those just described, we inquired into the effects of reduction time and temperature upon the theoretical and real capacities.

In one series of tests a reduction temperature of about 244° C. was maintained at all times and the reduction period was varied from half an hour up to four hours. The effects upon the capacities of the tested plaques are illustrated graphically in FIGURE 1, which indicates that there is little to be gained by extending the reduction time beyond 1½ hours.

In another series of tests the reduction time was made a constant, namely 1½ hours, and the reduction temperature was varied, some plaques being treated throughout at a temperature as low as 211° C. while others were treated at higher reduction temperatures ranging up to 293° C. The results of this series of tests is recorded graphically in FIGURE 2 which showed that, while capacity at first increased with increased reduction temperature, above about 230° C. increasing the temperature has no noticeable effect on real capacity although it gave a small increase in theoretical capacity.

It was found that the capacity could be increased by giving any selected plaque a plurality of impregnation cycles. Tests were made which involved giving two plaques (labelled A and B) two impregnation cycles of 1½ hours reduction time at a temperature of 244° C., and another pair of plaques (labelled C and D) three impregnation cycles of 2 hours reduction time at a temperature of 263° C. The results are summarized in the table set out below. It will be noted that the increase in capacity with multiple impregnation is very nearly additive.

Table

| Impregnation | 2 x 1.5 hrs. at 244° C. | | | 3 x 1.5 hrs. at 263° C. | | |
| --- | --- | --- | --- | --- | --- | --- |
| | Approx. Current Density, ma./cm.² | Capacity, amp. hrs./cm.³ | | Approx. Current Density, ma./cm.² | Capacity, amp. hrs./cm.³ | |
| | | A | B | | C | B |
| Plaque | | | | | | |
| Theoretical capacity | | 0.60 | 0.53 | | 0.90 | 0.83 |
| 20 hr. rate | 0.6 | 0.46 | 0.46 | 0.9 | 0.69 | 0.69 |
| 3 hr. rate | 6 | 0.40 | 0.40 | 9 | 0.57 | 0.55 |
| 1 hr. rate | 19 | 0.37 | 0.39 | 28 | 0.45 | 0.47 |
| 1 amp | 100 | 0.23 | 0.28 | 100 | 0.41 | 0.33 |
| 3 hr. rate | 6 | 0.40 | 0.40 | 9 | ¹ 0.41 | ¹ 0.38 |

¹ 7 days stand charged.

What we claim as our invention is:

1. A method of incorporating an electrochemically active cadmium compound into a porous sintered nickel plaque in the preparation of negative plates for nickel-cadmium storage batteries, which comprises soaking the plaque for at least about 10 minutes in molten $$Cd(NO_3)_2 \cdot 4H_2O$$

which has been heated to boiling at a sub-atmospheric pressure, removing the plaque and reducing the cadmium nitrate contained therein by heating the plate in a hydrogen filled container for about ½ hour to about 2 hours at a temperature of from about 200° C. to about 300° C. and allowing the plaque to cool in a hydrogen atmosphere.

2. A method as defined in claim 1, in which the soaking step is carried out for at least 10 minutes at a pressure of about 15 mm. of mercury.

3. A method of incorporating an electrochemically active cadmium compound into a porous sintered nickel plaque which comprises repeating the steps of claim 1 at least twice.

4. A method of incorporating an electrochemically active cadmium compound into a porous sintered nickel plaque which comprises repeating the steps of claim 1 at least three times.

References Cited in the file of this patent

UNITED STATES PATENTS

| 850,881 | Edison | Apr. 16, 1907 |
| 1,885,451 | Kraenzlein et al. | Nov. 1, 1932 |
| 2,634,303 | Moulton | Apr. 7, 1953 |
| 2,831,044 | Bourgault et al. | Apr. 15, 1958 |
| 2,880,257 | Murphy | Mar. 31, 1959 |

FOREIGN PATENTS

| 331,540 | Great Britain | July 4, 1930 |